United States Patent [19]

Cockman

[11] Patent Number: 4,485,013
[45] Date of Patent: Nov. 27, 1984

[54] LIQUID SEPARATOR AND PURIFICATION SYSTEM

[76] Inventor: Haggie I. Cockman, P.O. Box 1600, Sanford, Fla. 32771

[21] Appl. No.: 297,733

[22] Filed: Aug. 31, 1981

[51] Int. Cl.$^3$ .............................................. B01D 33/04
[52] U.S. Cl. .............................. 210/242.2; 210/242.3; 210/396; 210/401; 210/416.1; 210/923; 261/112
[58] Field of Search .................. 210/923, 242.1, 242.2, 210/242.3, 386, 400, 150, 151, 922, 776, 780, 783, 799, 396, 401, 416.1, 220, 198.1, 169; 261/112, DIG. 75; D23/85, 36

[56] References Cited

U.S. PATENT DOCUMENTS

| | | | |
|---|---|---|---|
| 3,268,081 | 8/1966 | Menkee et al. | 210/242.1 |
| 3,497,185 | 2/1970 | Dively | 261/36 |
| 3,730,119 | 5/1973 | Budris et al. | 210/242.3 |
| 3,804,177 | 5/1974 | Renfroe | 210/242.3 |
| 3,876,542 | 4/1975 | Carlson | 210/150 |
| 3,951,805 | 4/1976 | Dodd | 210/400 |
| 3,959,135 | 5/1976 | Shattock | 210/400 |
| 4,006,082 | 2/1977 | Irons | 210/923 |

Primary Examiner—Richard V. Fisher
Assistant Examiner—Wanda L. Millard
Attorney, Agent, or Firm—William M. Hobby, III

[57] ABSTRACT

A liquid purification and separator system is adapted to be floated upon a body of water and to be moved from location to location and has a liquid collection section for collecting water connected by a water line to a floating purification unit. The floating purification unit includes at least one aeration tower having a dispersing nozzle for spraying the collected liquids in a fine spray onto the tower. The liquids collect on the towers and trickle down to moving filter belts which allows the water to pass through and back into the body of water. This process enables the system to collect solid particles such as hydrocarbons, oil, coal, mined minerals and particles from sewer plants and industrial plants. The rotating belts are cleaned at one end to remove the collected pollutants into a collection container. The system also acts to cool the water as it passes through the aerator.

21 Claims, 5 Drawing Figures

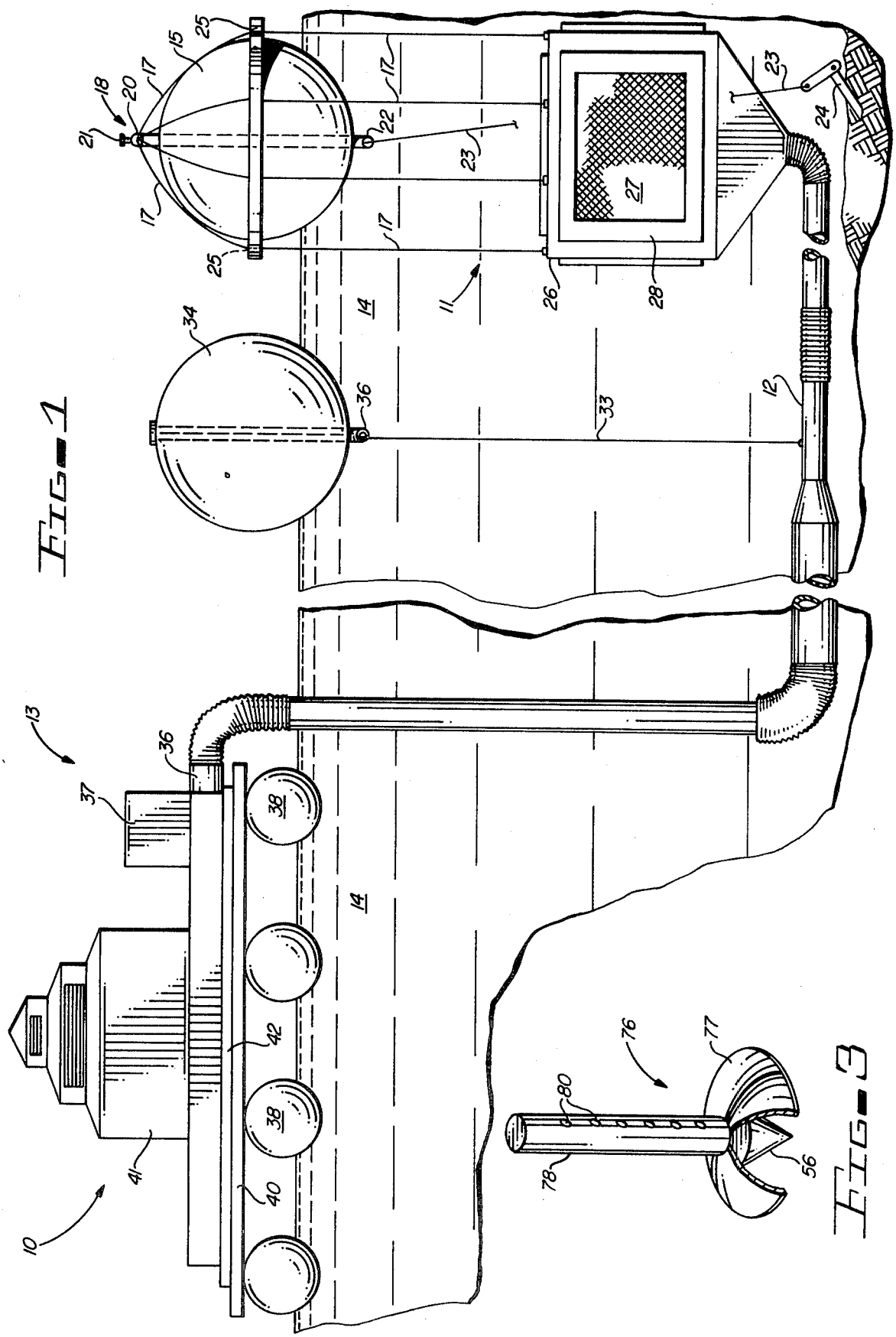

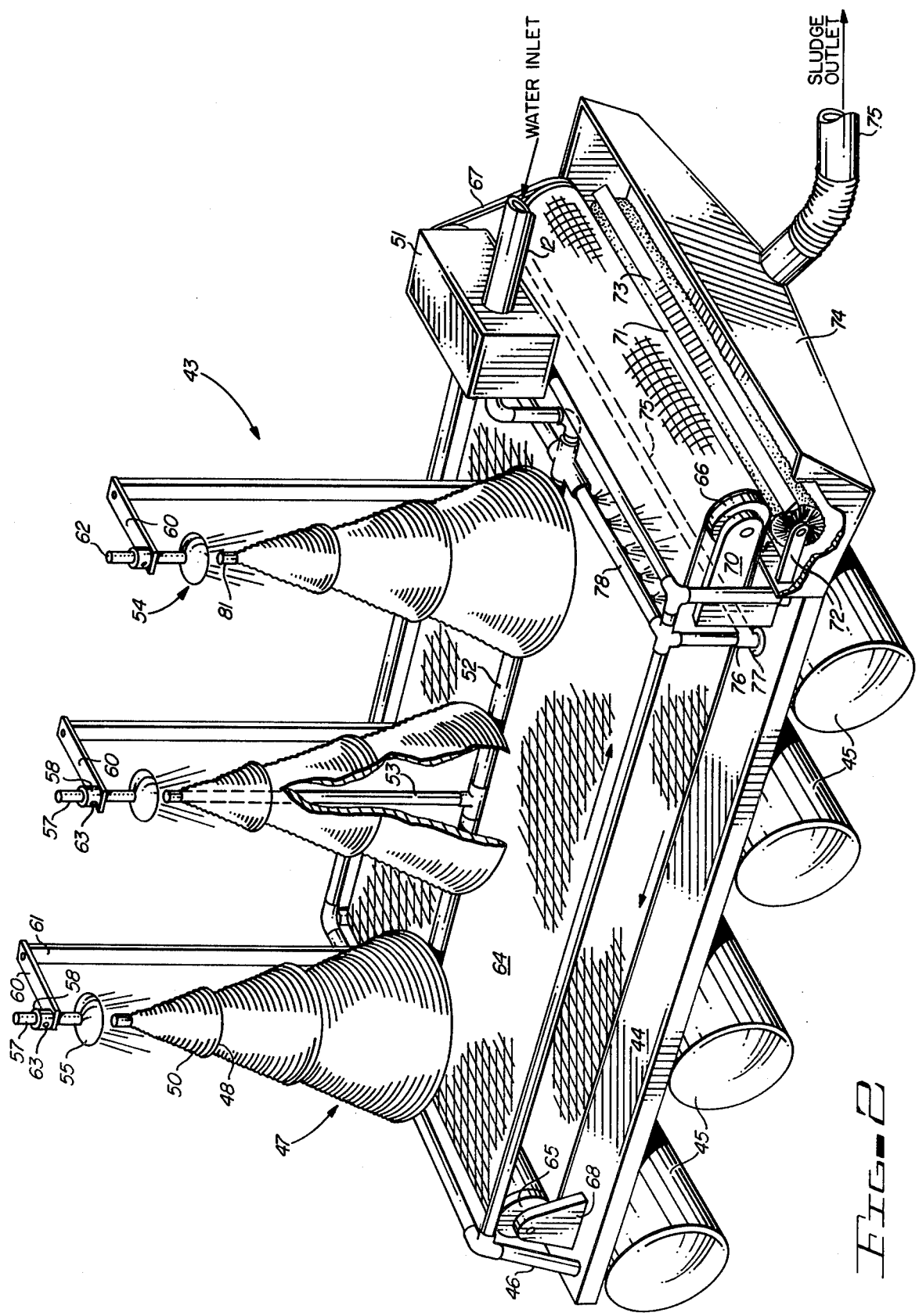

_4,485,013_

LIQUID SEPARATOR AND PURIFICATION SYSTEM

BACKGROUND OF THE INVENTION

The present invention relates to a liquid purification system and especially to a floating system adapted to aerate, cool and clean water in a large body of water.

In the past, a large variety of liquid purification systems have been provided for treating all types of liquids and especially for treating polluted water. In addition, various types of liquid cooling towers have been provided for heat exchangers for cooling of liquid which has been heated in industrial processes or in air conditioning equipment. Finally, there have been a large number of systems directed for removing oil, or other hydrocarbons, spilled on bodies of waters; and these frequently include skimmer type boats which skim the top of the water to remove floating oil which is then collected and removed to a storage tank. Another type of prior art skimmer utilizes a moving web moving through the surface of the water which captures oil but will allow the water to fall off. The oil is then squeegeed in some manner from the moving web.

The present invention is directed to a liquid purification system which is adapted to be floated from location to location for cleaning large volumes of liquid in a body of water, including aerating the liquid while acting as a trickle filter and as a filter for collecting fine particles and solid pollutants, along with hydrocarbons such as oil.

SUMMARY OF THE INVENTION

A liquid purification system is provided having a liquid collection unit for collecting liquid for purification. A liquid line feeds the collected liquid from the liquid collecting unit to a floating purification unit. A floating purification unit may be floated on pontoons or other flotation material on a body of water and is connected to the liquid line for receiving liquid from the liquid collection unit. The liquid is forced into a dispersion nozzle for dispersing into a fine spray onto one or more stepped towers, where it is allowed to trickle to the bottom of the tower onto a movable filter belt located below the towers for collecting the liquid therefrom to remove solid and hydrocarbon pollutants from the water. Means are provided for removing the hydrocarbons and solid pollutants from the filter belt into a collection container where it can be removed to shore. The liquid collection unit may have a screen filter for filtering large solid material from the filter system and may be adapted to float on the surface or below the surface at adjustable depths as desired.

BRIEF DESCRIPTION OF THE DRAWINGS

Other objects, features and advantages of the present invention will be apparent from the written description and the drawings, in which:

FIG. 1 is a diagrammatic view of the overall system;

FIG. 2 is a perspective view of the floating purification unit in accordance with the present invention;

FIG. 3 is a cutaway perspective of the liquid dispersant nozzle used in FIG. 2;

DESCRIPTION OF THE PREFERRED EMBODIMENTS

Figure 4:
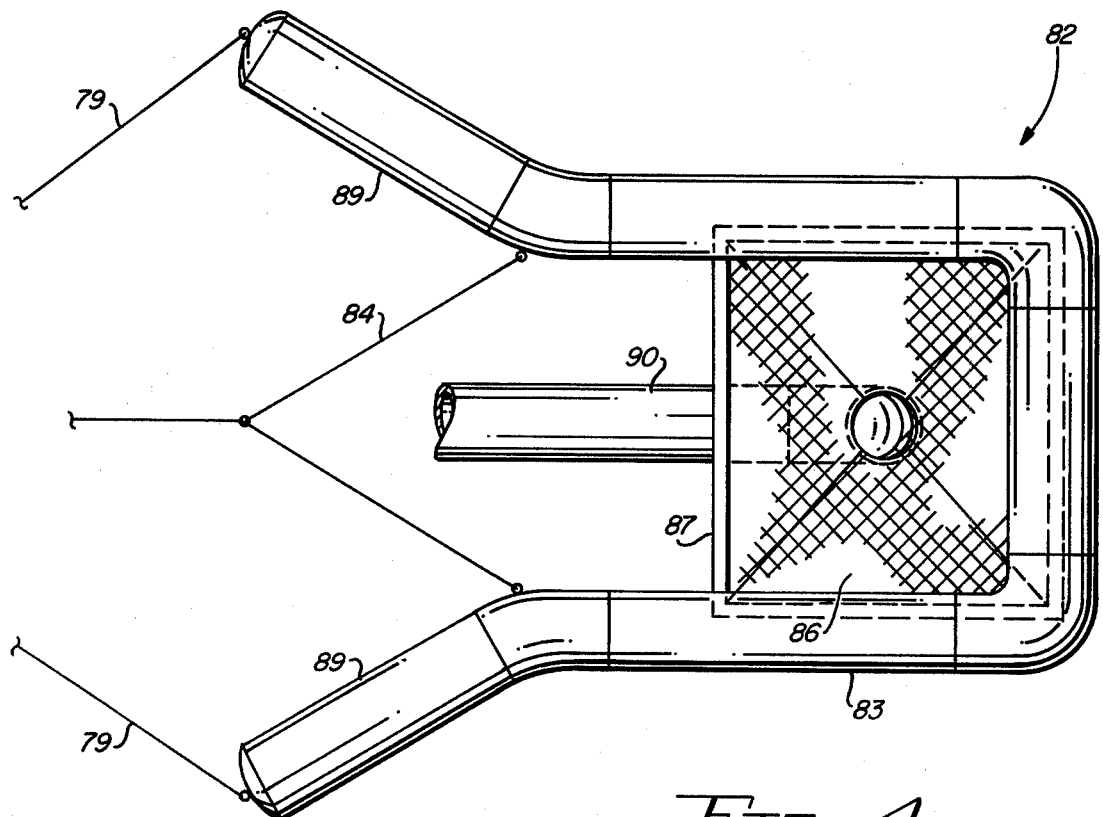
FIG. 4 is a top elevation of a floating skimmer unit in accordance with the present invention.

Referring to FIG. 1 of the drawings, an overall liquid purification system 10 is illustrated having a liquid collection unit 11 connected by a liquid line 12 to a floating purification unit 13. The entire system floats on a body of water 14 which might be a lake, an industrial settling pond, or a cooling pond for a power plant, or the like. The liquid collection unit 11 has a flotation sphere 15 having an annular harness supporting a plurality of support lines 17 connected to a top clamping unit 18. The clamping unit provides an aperture 20 and a clamping bolt 21 having a small handle thereon for clamping the line 17 through the opening 20. The bottom of the sphere has an anchor bracket 22 having an anchor line 23 connected thereto and to an anchor 24 for holding the flotation sphere 15 in position on the body of water 14. The lines 17 pass through a plurality of apertures 25 in the line supporting harness and are connected to the collection unit screening box 26. The depth of the box 26 below the surface of the water is determined by the length the lines 17 are pulled through the opening 18 and clamped with a clamping bolt. A collection box 26 has large screened wire sides 27 attached to a square framework 28 with an inverted pyramid shaped collection unit 30 on the bottom of the box 26. A finer screen may be provided between the box 26 and the collection pyramid 30 for collecting debris.

Figure 5:
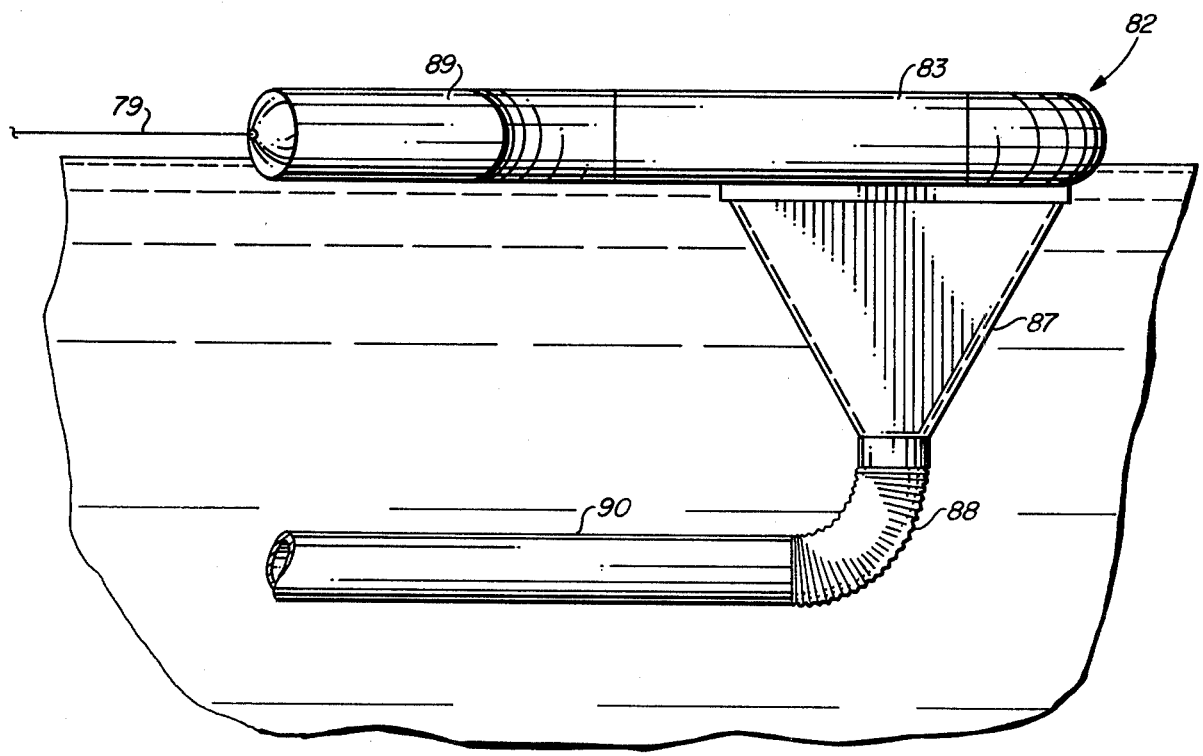
FIG. 5 is a side elevation of the skimmer unit of FIG. 4.

It should be understood at this point that this is only one liquid collection unit of a series of different types for collecting liquid from different positions. A surface skimming unit is illustrated in connection with FIGS. 4 and 5 and it should be clear that the unit in FIG. 1 can also be adapted to sit on the bottom of a lake, pond, or the like, without departing from the spirit and scope of the invention.

The liquid pipe 12 had flexible connectors 31 connected to a more rigid, but still flexible, pipe 32 which may be inexpensive polyvinyl chloride (PVC) pipe, or the like. The pipe 12 may be supported with auxiliary lines 33 connected to one or more auxiliary flotation spheres 34 having a bracket 35 for holding the line 33. The line 12 is connected to the floating liquid purification unit 13 rigid pipe 36 which connects into a housing 37, housing a small internal combustion engine driving a water pump drawing the water from the collection unit 11 through the pipe 12 to the floating purification unit 13. The engine is also used to rotate a power webbing or belt, as will be more fully described hereinafter in connection with FIG. 2. The liquid purification unit 13 has a plurality of pontoon type floats 38 supporting a framework 40 having an enclosed aeration and cooling tower 41 mounted on the top thereof and a filtration system in a casing 42. The system allows liquid to be picked up from different depths and different locations in a body of water and pumped to the purification system where the liquid is purified and fed back into the body of water. The unit advantageously can be moved from location to location to purify different portions of a pond, or the like.

Turning now to FIG. 2, a perspective view of a preferred embodiment of a floating purification unit 43 is shown having a base or platform 44 supported by a plurality of flotation pontoons 45. The base 44 has a framework 46 mounted thereto which in turn supports a plurality of cooling aeration and purification towers 47. Each tower 47 is stepped with a plurality of steps a grooved smaller stepped surface 50, derived from the liquid line 12 into the engine housing 51 where it is pumped through the liquid line 52 below each of the towers 14 and out through individual tower lines 53 and into a liquid dispersion nozzle. The water is directed out into the apex of the spray 54 which disperses the liquid into a much larger surface for aerating and cooling the liquid which is allowed to trickle down the surface of each tower. The dispersion, cooling, and aerating action, produces an aeration of the liquid as well for the liquid. The nozzle 54 has a cup member 55 which is identical to the inverted pyramid for the absence of the aeration nozzle 48. The cup member 55 has an adjustment bracket 60 supported on a sleeve 58 mounted thereto and slides in a sleeve 58 mounted on a support 61. The rod 57 has a plurality of openings 58 through so that a pin 63 can be used for adjustment through one of the openings to desired sion nozzle 54 and cup 55 down the liquid trickling 54 and cup 55 down the web or belt 64 which may be any material desired for any mesh of the belt or web solid pollutants and other matter which may roller 64 on one end, and may have a driven be driven by belt at the other end and may have a driven end, and may be driven by belt engine housing 51 or supplied.